United States Patent [19]
Hensley

[11] Patent Number: 6,050,649
[45] Date of Patent: Apr. 18, 2000

[54] BRAKE CONTROLLER

[75] Inventor: James C. Hensley, Centralia, Ill.

[73] Assignee: James Hensley Revocable Trust A, Centralia, Ill.

[21] Appl. No.: 09/032,263

[22] Filed: Feb. 27, 1998

Related U.S. Application Data

[60] Provisional application No. 60/040,537, Mar. 13, 1997.

[51] Int. Cl.[7] .................................................. B60T 13/00
[52] U.S. Cl. .................................... 303/7; 303/3; 303/20; 188/158
[58] Field of Search ................................ 303/7, 20, 123, 303/3, 155, 113.4; 188/158, 159, 161–163, 112 R, 112 A, 3 R, 3 H, 138; 340/479; 74/512, 514

[56] References Cited

U.S. PATENT DOCUMENTS

| | | | |
|---|---|---|---|
| 2,169,668 | 8/1939 | Thomas | 303/7 |
| 2,407,510 | 9/1946 | Oetzel | 188/158 |
| 3,135,358 | 6/1964 | Greentree | 188/3 R |
| 3,423,135 | 1/1969 | Beltramo | 303/7 |
| 3,486,799 | 12/1969 | Greentree | 303/7 |
| 3,503,652 | 3/1970 | Vanden Broek | 303/3 |
| 3,507,541 | 4/1970 | Ayers, Jr. | 303/7 |
| 3,574,414 | 4/1971 | Jacob | 303/20 |
| 3,724,913 | 4/1973 | Levy . | |
| 3,840,276 | 10/1974 | Jubenville | 303/7 |
| 3,909,075 | 9/1975 | Pittet, Jr. et al. . | |
| 3,967,863 | 7/1976 | Tomecek et al. . | |
| 3,981,542 | 9/1976 | Abrams et al. | 303/20 |
| 4,033,630 | 7/1977 | Hubbard | 303/7 |
| 4,262,769 | 4/1981 | Bernoteit et al. | 303/3 |
| 4,295,687 | 10/1981 | Becker et al. | 303/20 |
| 4,398,252 | 8/1983 | Frait . | |
| 4,572,030 | 2/1986 | Sakurai et al. . | |
| 4,721,344 | 1/1988 | Frait et al. . | |
| 4,726,627 | 2/1988 | Frait et al. . | |
| 4,802,562 | 2/1989 | Kuroyanagi et al. . | |
| 4,804,237 | 2/1989 | Gee et al. . | |
| 4,819,992 | 4/1989 | Angelillo et al. | 303/3 |
| 4,888,997 | 12/1989 | Eckert et al. . | |
| 4,978,177 | 12/1990 | Ingraham et al. . | |
| 5,010,972 | 4/1991 | Ingraham et al. . | |
| 5,217,280 | 6/1993 | Nykerk et al. . | |
| 5,251,966 | 10/1993 | Friederichs et al. . | |
| 5,273,347 | 12/1993 | Hansson . | |
| 5,427,440 | 6/1995 | Ward et al. . | |
| 5,438,516 | 8/1995 | Neubauer et al. . | |
| 5,443,306 | 8/1995 | Broome . | |
| 5,563,355 | 10/1996 | Pluta et al. | 303/3 |
| 5,615,930 | 4/1997 | McGrath et al. . | |
| 5,620,236 | 4/1997 | McGrath et al. . | |

FOREIGN PATENT DOCUMENTS

| | | | |
|---|---|---|---|
| 2551711 | 3/1985 | France | 303/20 |

OTHER PUBLICATIONS

Jordan Research Corporation, 2020 With An Eye To The Future ULTIMA, pp. 1–10, undated.

Jordan Research Corporation, 2020 With An Eye To The Future ULTIMA, The Full Time Proportional Digital Electronic Trailer Braking System, undated.

*Primary Examiner*—Douglas C. Butler
*Attorney, Agent, or Firm*—Polster, Lieder Woodruff & Lucchesi, L.C.

[57] ABSTRACT

A brake controller for use in a tow vehicle to control the application of towed vehicle brakes. The brake controller is responsive to movement of the tow vehicle brake pedal to send electronic brake control signals to the towed vehicle brakes, actuating the brakes in proportion to the movement of the brake pedal. An optical coupler senses movement of the brake pedal by a graduated increase in transmitted light, or by counting marks associated with a spring-tensioned cable or chain secured between the tow vehicle firewall and the brake pedal arm. A microcontroller is incorporated into the brake controller to adjust the proportionality of the brake actuation in response to operator gain settings, and to allow for manual actuation of the towed vehicle brakes.

19 Claims, 6 Drawing Sheets

BRAKE CONTROLLER

CROSS-REFERENCE TO RELATED APPLICATIONS

Priority date from provisional U.S. patent application Ser. No. 60/040,537 filed Mar. 13, 1997.

STATEMENT REGARDING FEDERALLY SPONSORED RESEARCH OR DEVELOPMENT

Not Applicable.

BACKGROUND OF THE INVENTION

This invention relates generally to towed vehicle brake controllers and, in particular, to a novel towed vehicle brake controller which can be retrofitted to a tow vehicle to effect a gradual application of the towed vehicle brakes proportional to the movement of the tow vehicle brake pedal.

Towed vehicles, such as recreational and utility trailers adapted to be towed by automobiles and small trucks, are commonly provided with electronic braking systems. The electric brakes generally include a pair of brake shoes located at each wheel which, when actuated, frictionally engage a brake drum. An electromagnet is mounted on one end of a lever to actuate the brake shoe, and is drawn against the rotating brake drum when an electric current is applied, thereby pivoting a lever to actuate the brake shoes. Typically, the braking force provided is proportional to the electric current applied to the electromagnet. The electric current may run as high as 12 amperes on a double axle trailer.

The first electric brake controllers for actuating towed vehicle brakes incorporated a large rheostat switch mounted in a position for the driver of the tow vehicle to be able to manually activate the towed vehicle brakes as needed. Later designs employed a hydraulic slave cylinder in the controller with a hydraulic line connecting the tow vehicle brake system to the controller. Thus, when the vehicle brakes were applied, the controller sent an electrical current to the towed vehicle brakes in proportion to the pressure applied to the tow vehicle braking system. Alterations to tow vehicle hydraulic braking systems where generally discouraged by automobile manufacturers, resulting in the introduction of electronic brake controllers which did not connect directly to the tow vehicle hydraulic systems. These electronic controllers were simply timers which applied the towed vehicle brakes at a pre-set time interval after the application of the tow vehicle brakes. The "timer" type controllers did not sense or accommodate the difference between gradual brake application and an emergency stop. That is, when the tow vehicle brake is applied, the towed vehicle brakes were applied after the pre-set time interval, regardless of the braking conditions.

An improvement over the timer-type controllers was the addition of a mercury switch which employed the inertia of small amount of liquid mercury to close a pair of contacts during rapid deceleration of the tow vehicle, triggering full application of the towed vehicle brakes during an emergency stop.

Still further improvements over the timer-type controllers consisted of the incorporation of a pendulum or similar device to sense deceleration of the tow vehicle caused by braking. An electronic circuit would generate a brake control signal proportional to the pendulum displacement during deceleration. These designs suffer from several inherent problems. First, because the towing vehicle and towed vehicle are connected together, the driver must initially slow the towed vehicle by application of the tow vehicle brakes. The towing vehicle must undergo sufficient deceleration for the pendulum or similar device to activate the towed vehicle brakes. If the controller is fine-tune adjusted, and a heavy towing vehicle is pulling a lightweight towed vehicle, the deceleration sensor system works well. However, very few drivers are capable of adjusting these controllers with the degree of precision necessary for optimal performance. In the more common situation, where a light tow vehicle is pulling a heavy towed vehicle, it is impossible to produce maximum towed vehicle braking by setting the control so that it activates with emergency-type stopping power even in normal, non-emergency stopping situations. Essentially, the momentum of the heavy towed vehicle will "push" the tow vehicle, preventing it from decelerating at a sufficient rate to fully activate the towed vehicle brakes.

Regardless of the type of deceleration sensor or brake control signal initiator device, known electronic brake controllers also usually include an analog pulse width modulator which receives the brake control signal from the sensing unit. The pulse width modulator is responsive to the brake control signal for generating an output signal comprising a fixed frequency pulse train. The pulse width modulator varies the duty cycle of the pulse train in proportion to the magnitude of the brake control signal, thus the duty cycle of the pulse train corresponds to the amount of towed vehicle braking desired. The output of the pulse width modulator is typically used to control the switching of power transistors on and off, supplying power to the towed vehicle brakes, with the resulting brake application directly proportional to the duty cycle of the pulse width modulator output.

BRIEF SUMMARY OF THE INVENTION

Among the several objects and advantages of the present invention may be noted the provision of a brake controller capable of activating towed vehicle brakes in a gradual manner responsive to the displacement of the tow vehicle brake pedal;

The provision of such a brake controller which allows for the activation of towed vehicle brakes in a manner balanced with the tow vehicle brake application;

The provision of such a brake controller which permits the appropriate amount of towed vehicle brake application to accommodate varied braking situations;

The provision of such a brake controller which utilizes a microcontroller;

The provision of such a brake controller which may be adjusted to compensate for varied conditions of the tow vehicle braking system;

The provision of such a brake controller which may be adjusted to compensate for a variety of weight distributions between the tow vehicle and the towed vehicle;

The provision of such a brake controller which is capable of activating towed vehicle brakes without activation of the tow vehicle braking system; and The provision of such a brake controller which is simple in design, easy to install and to maintain, and well suited for its intended purpose.

In accordance with the present invention, a brake controller is provided that can be attached to the brake pedal of a tow vehicle and electronically connected to the brakes of the towed vehicle to allow for a balanced application of the towed vehicle brakes in response to movement of the tow vehicle brake pedal.

In a first embodiment of the present invention, a brake controller sensing unit which operates independently of tow vehicle deceleration or tow vehicle brake force is disclosed. The brake controller includes a casing having an internal spring-loaded reel or drum with tapered circumferential edge. The controller is connected between the tow vehicle brake pedal and a stationary fixture, such as the engine firewall. The reel is positioned between a light source and an optical detector. An optical connector is in turn electronically connected to the towed vehicle brakes so as to cause variable actuation of the towed vehicle brakes in response to the output of the optical detector. Depressing the tow vehicle brake pedal causes the spring-loaded reel to turn under the force of the spring. The further the brake pedal is depressed, the further the reel rotates. During rotation, the tapered edge of the drum acts as a variable-size shutter, proportionally blocking and passing light from the light source to the optical detector in a variable amount dependent upon the position of the tapered edge of the drum, which is in turn dependent upon the position of the tow vehicle brake pedal. The brake control signal output by the optical connector is independent of any tow vehicle deceleration, sensing only the relative displacement of the tow vehicle brake pedal arm from the rest position. As such, the towed vehicle brakes may be actuated by depressing the brake pedal when the tow vehicle is at a full stop (such as when parked on an incline) or when there is a compete failure of the tow vehicle braking system. In such an emergency situation, depressing the tow vehicle brake pedal would not result in deceleration of the tow vehicle, however, the brake controller of the present invention would continue to function, and actuate the towed vehicle brakes.

In a second preferred embodiment of the brake controller of the present invention, an optical coupler is employed to detect angular displacement of the tow vehicle brake pedal arm from a rest position. The brake controller includes a casing mounted on the tow vehicle brake pedal arm and having an internal spring-loaded winder securing one end of a connecting cable. The opposite end of the connecting cable is passed out a vertically elongated opening in the casing and fastened under tension to a stationary fixture, such as the engine firewall. As the cable exits the casing, it passes between the light source and optical receiver of an optical coupler. At rest position (i.e. no displacement of the tow vehicle brake pedal) the cable fully blocks the optical coupler, and no signal is generated. As the tow vehicle brake pedal is depressed, the spring-loaded winder maintains the tension on the connecting cable, and the angle at which the cable exits the casing shifts proportional to the displacement of the brake pedal. The alteration in the geometry of the connecting cable connection points results in the unblocking of a portion of the light source, and the generation of a proportional brake control signal by the optical coupler. The cable is adjusted such that full depression of the brake pedal results in the cable completely clearing the optical coupler, resulting in a full-strength signal. The optical connector is in turn electronically connected to the towed vehicle brakes so as to cause variable actuation of the towed vehicle brakes in response to the brake control signal of the optical detector.

In a third preferred embodiment of the brake controller of the present invention, an optical coupler is used to count index marks on the spring-loaded reel or on a tensioned element such as the tensioned links of a chain connected to a spring-loaded winder. The index marks may be comprised of holes, slots, or of reflective strips. Similarly, a ball-chain or link-chain or similar indexed element may be employed wherein the individual elements of the chain function in a manner identical to the marks, with each ball or link alternately blocking and exposing the optical coupler receiver element to the light source. The count of the indexes, e.g. marks or chain elements, is electronically transmitted to a microcontroller which has been programmed to actuate, electronically the towed vehicle brake system. For example, as the towing vehicle brake pedal is depressed, the drum or winder rotates and the series of slots, reflective strips, or chain links corresponding to the movement is counted by the optical coupler or reflective sensor. A signal representative of the count is transmitted to the microcontroller which has been appropriately programmed, and which in turn, increases through a power transistor, the actuation of the towed vehicle brakes based upon the number of marks or links counted. As the reel continues to rotate and the greater number of marks, slots, or chain links pass through the light, the microcontroller will increase the braking power of the towed vehicle brakes.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description will clearly enable one skilled in the art to make and use the invention, describes several embodiments, adaptations, variations, alternatives, and uses of the invention, including what I presently believe is the best mode of carrying out the invention.

Figure 1A:
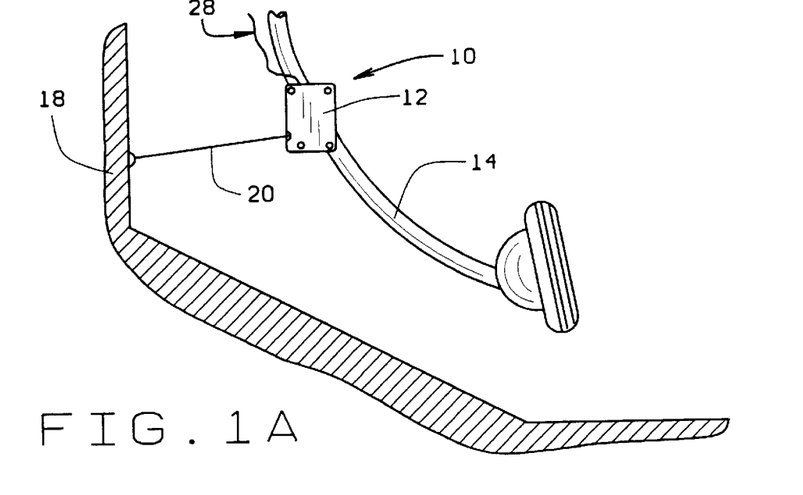
FIG. 1A is an elevational view of the first preferred embodiment of the brake controller of the present invention attached to a brake pedal arm and to the firewall of a tow vehicle.

Turning to FIG. 1 of the drawings, the first preferred embodiment of the brake controller of the present invention is indicated generally by reference numeral 10. As can be seen in the drawing, the controller 10 includes a housing 12 appropriately mounted or attached to a brake pedal arm 14 in any suitable manner. Housing 12 includes an opening 16 on the peripheral edge adjacent the engine firewall 18 of the tow vehicle. A cable or chain 20 extends out of the opening 16 and is secured to the engine firewall 18. As will be described later, the cable or chain 20 is kept under constant tension.

Figure 1B:
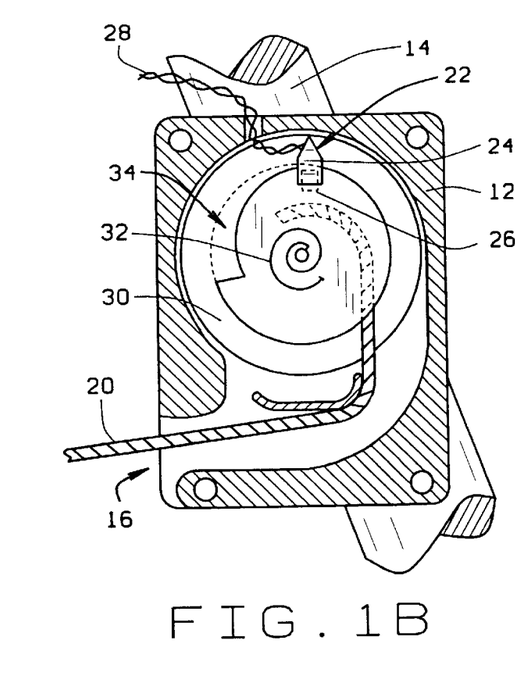
FIG. 1B is an enlarged sectional view of interior of the housing with the tapered spring-loaded reel in the rest position.
Figure 1C:
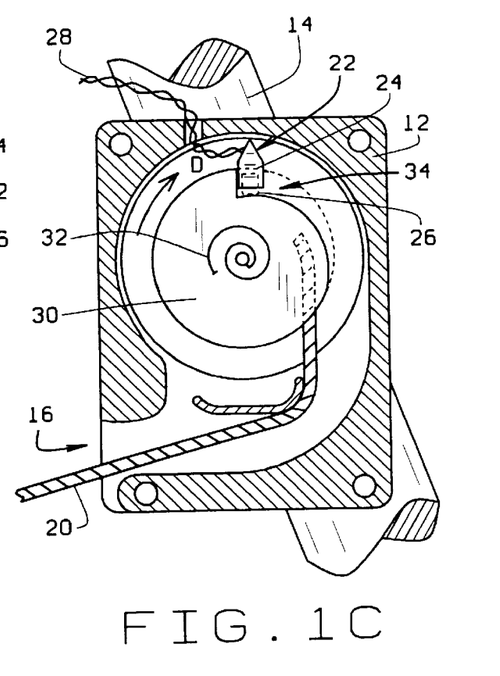
FIG. 1C is an enlarged sectional view similar to FIG. 1B, with the reel in the full-on position.

Controller 10 also includes an optical coupler, indicated generally as reference numeral 22 in FIGS. 1B and C. The optical coupler 22 includes a light emitter 24 on one side of the housing 12 and a light receiver 26 on the opposite side of the housing. The optical coupler is electronically connected to a towed vehicle braking system (not shown) by wires 28.

FIGS. 1B and C illustrate a spring loaded reel 30 which is included inside the housing. The reel 30 is appropriately mounted inside the housing and operatively connected to a flat spring 32. A first end of the cable or chain 20 is connected to the reel 30 and the opposite end is secured to the engine firewall 18. The cable or chain 20 is maintained at a constant tension by the flat spring 32, and maintains the reel in a predetermined position when the tow vehicle brake pedal is not depressed. It will be appreciated, by viewing FIGS. 1B and C that the reel includes a light sensor opening 34 that allows the light emitted by the optical coupler light emitter 24 to pass unobstructed to the light receiver 26 when the brake pedal is fully depressed as shown in FIG. 1B, and as will be explained below.

In the first preferred embodiment, the opening 34 in reel 30 defines a tapered radial cutout which allows the reel to serve as a rotating shutter so as to variably interrupt the optical coupling light passing through the device. The cable or chain 20 and the flat spring are preloaded in housing 12 so that the tapered radial cutout 30 is positioned adjacent to, and not exposing the light receiver 26 as shown in FIG. 1B. When the light is interrupted or blocked, no signal is sent to the electronically connected trailer brakes. As the brake pedal is depressed, and the brake pedal arm and controller 14 move towards the firewall 18, the flat spring urges the reel to rotate in the direction of arrow D, and to take up the slack in cable or chain 20. This allows rotation of the reel and the tapered radial cutout to gradually uncover the light beam. Conversely, as the brake pedal is released, the flat spring will urge the reel to rotate in the opposite direction and allow the cable or chain to pull out. As the reel rotated in the opposite direction of arrow D, the tapered radial cutout begins to cover the area of opening 34. The tapered radial cutout thus allows the edge of the reel to act as a variable shutter. When the brake pedal is depressed, the light passing through opening 34 is increased to the receiver 26. The increased light results in optical coupler 22 relaying an electronic impulse or brake control signal to the towed vehicle brakes, thereby actuating the brakes. When opening 34 is positioned such that the light is fully unblocked, as is shown in FIG. 1C the towed vehicle brakes are actuated in the full "on" position. As will be appreciated by one skilled in the art, due to the tapered radial opening 34, the amount of light transmitted through the device can vary from full light, as shown in FIG. 1C to no light as shown in FIG. 1B. The conventional electronic circuits (not shown) can actuate the towed vehicle brakes in proportion to the amount of light transmitted, allowing variable or graduated trailer braking corresponding to the travel of the tow vehicle brake pedal. One skilled in the art will recognize that this embodiment of the brake controller of the present invention may be utilized to replace traditional deceleration sensors and brake force sensors in existing prior art brake controllers, as it generates a brake control signal which is proportional to the displacement of the tow vehicle brake pedal.

Figure 2A:
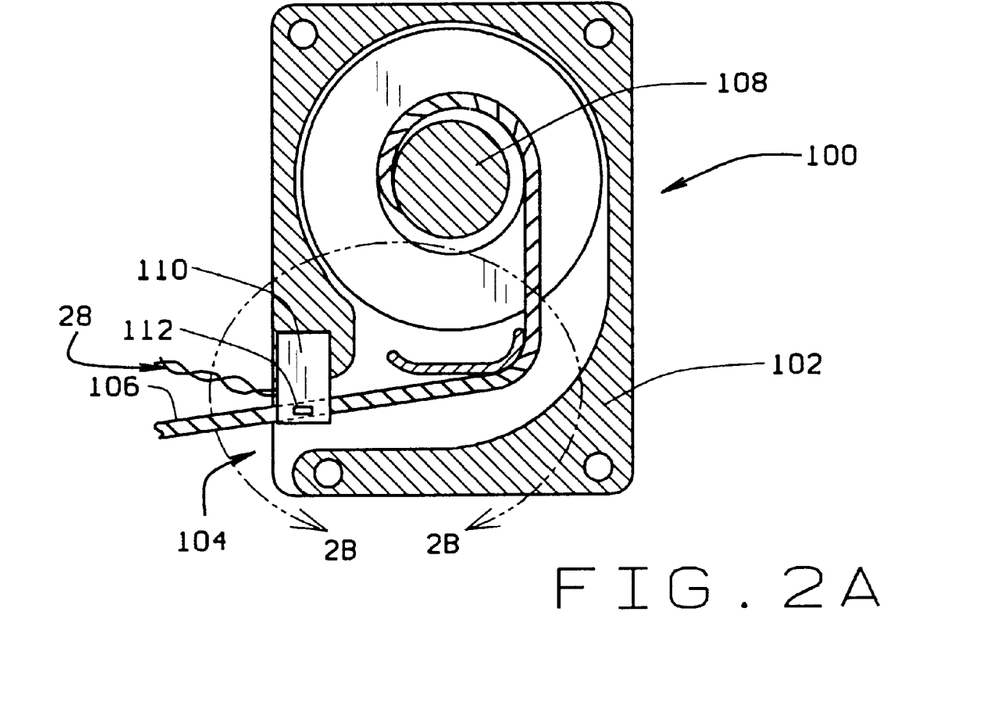
FIG. 2A is a sectional view similar to FIG. 1B, employing a wire and optical angle sensor, shown with the brake pedal in the rest position.
Figure 2B:
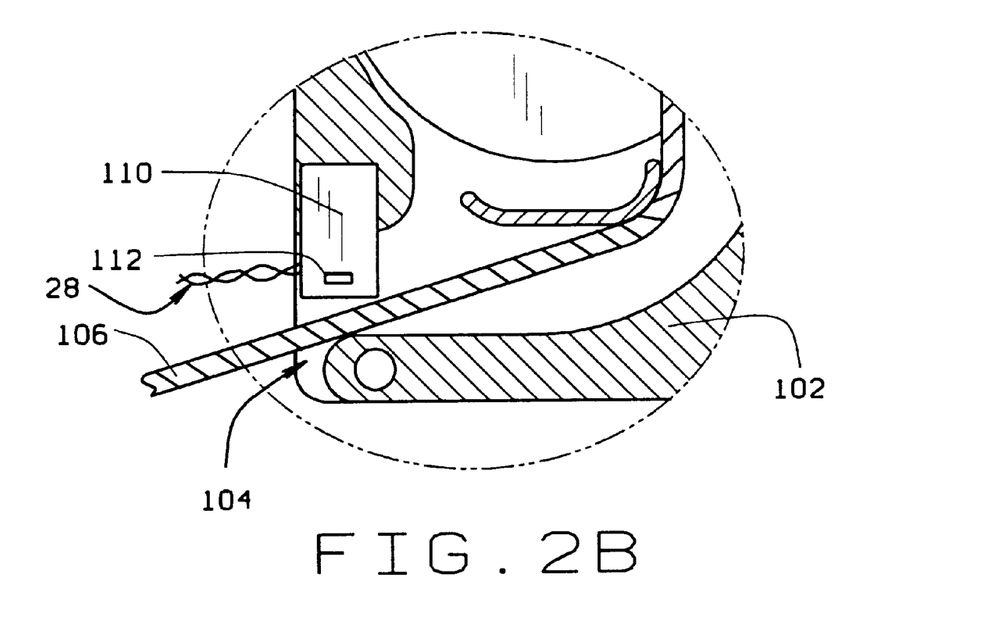
FIG. 2B is an enlargement of the wire and optical angle sensor of FIG. 2A, with the wire shown in the depressed brake pedal position.

In a second preferred embodiment of the brake controller of the present invention shown in FIG. 2A, the controller 100 includes a housing 102 appropriately mounted or attached to the tow vehicle brake pedal arm 14 in any suitable manner. Housing 102 includes a vertically elongated opening 104 in the peripheral edge of the housing adjacent the engine firewall 18. A cable 106 under constant tension extends from a spring-loaded winder 108 within the housing, through the opening, and is secured to the engine firewall. An optical coupler 110 mounted within the housing is employed to detect angular displacement of the tow vehicle brake pedal arm 14 from a rest position by detecting changes in the geometry of the cable 106, and is electronically connected to the towed vehicle brake system (not shown). As cable 106 exits the housing, it passes between the light source and optical receiver 112 of the optical coupler 110. At rest position (i.e. no displacement of the tow vehicle brake pedal) the cable fully blocks the optical coupler, and no brake control signal is generated. (FIG. 2A) When the tow vehicle brake pedal is depressed, the spring-loaded winder 108 maintains the tension on the cable, and the angle at which the cable exits the housing shifts proportional to the displacement of the brake pedal. The alteration in the geometry of the cable connection points results in the unblocking of a portion of the light source, and the generation of a proportional brake control signal by the optical coupler. The cable is adjusted such that full depression of the brake pedal results in the cable completely clearing the optical coupler, as shown in FIG. 2B, resulting in a full-strength brake control signal. The optical connector is electronically connected to the towed vehicle brakes so as to cause variable actuation of the towed vehicle brakes in response to the brake control signal of the optical detector.

Figures 3, 3A, 3B:
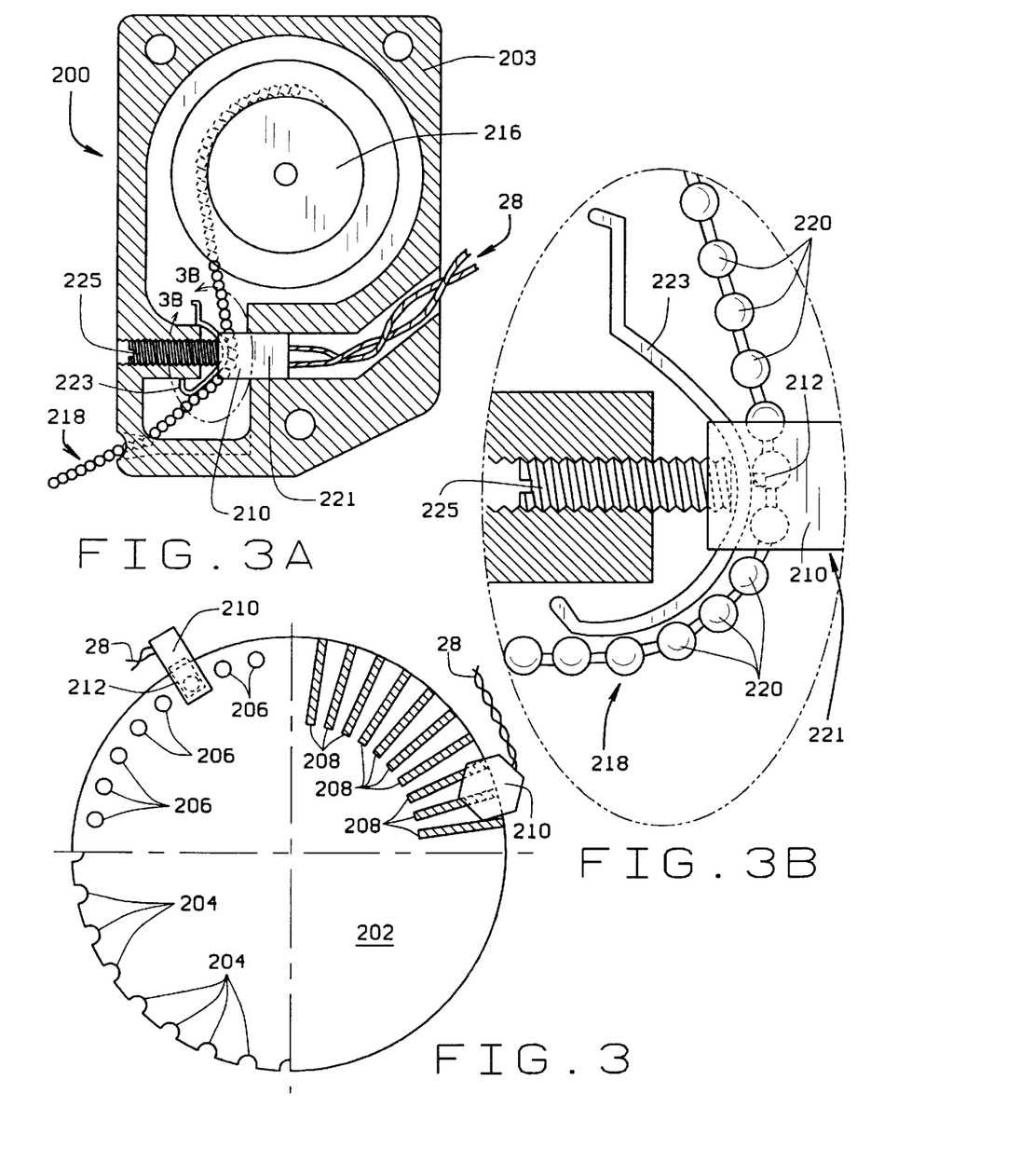
FIG. 3 is an illustration of several different index means which may be employed on the reel of one embodiment.
FIG. 3A is a sectional view of the spring-loaded reel portion of one embodiment of the brake controller of the present invention employing a chain and optical counter.
FIG. 3B is an enlargement of the chain and optical counter of the brake controller shown in FIG. 3A.

A third preferred embodiment of the present invention is indicated generally by reference numeral 200 in FIG. 3. The embodiment of controller 200 includes a spring-loaded reel 202 mounted in housing 203, having a plurality of slots, as shown generally at 204, holes 206, or reflective strips 208. The reel is contained within a housing secured in a conventional manner to the arm of the tow vehicle brake pedal. Within the housing, an optical light emitter 210 is positioned on one side of the reel and, if the embodiment includes slots 204 or holes 206, an optical receiver 212 is similarly positioned on the other side of the reel. A model HOA0901 opto-interrupter available from Honeywell, consisting of a single infrared light emitting diode and two infrared detectors is preferred. If reflective strips 208 are used, the optical emitter 210 can be a combination emitter/receiver secured within the housing 203 on one side of the reel without departing from the scope of the invention. Independent of the optical coupler, reel 202 is spring loaded as previously described relative to the first preferred embodiment, and a cable is secured to the reel at one end, exits the housing, and is correspondingly affixed at its opposite end to the vehicle firewall, actuating rotation of the reel upon displacement of the tow vehicle brake pedal.

Alternately, within the scope of this embodiment the reel with the holes or reflective strips may be replaced by the combination of a spring loaded winder 216 and a chain 218, as is shown in FIG. 3A. One end of chain 218 is secured to the winder, and the opposite end is secured to the engine firewall 18, to be maintained under a constant tension by the spring loaded winder. In the preferred alternate embodiment, the chain 218 is a linked-ball type chain, however, various chain types, including flat links are within the scope of the invention. As the tow vehicle brake pedal is depressed, the spring loaded winder 216 will rotate to maintain constant tension on the chain 218, and cause individual balls or links 220 in the chain to repeatedly interrupt the signal generated by the optical coupler 221, as they pass between the optical coupler's emitter 210 and receiver 212, as shown in FIG. 3B. The chain is positioned adjacent the optical coupler by a guide, 223 and compressed against the guide by a threaded set screw 225. As the tow vehicle brake pedal is released the winder will rotate in the opposite direction, and the balls or links will again move between the components of the optical coupler 221, but in the opposite direction.

The optical coupler (including the emitter 210 and receiver 212 or combination emitter/receiver) is electronically connected to a microcontroller 222 (FIG. 4) by wires 28 and counts the marks, consisting of either holes, reflective strips, or chain links, as the spring loaded reel or winder rotates in response to the movement of the tow vehicle brake pedal, as described above. Microcontroller 222 is electronically connected to the brake system of a towed vehicle 224. The microcontroller is preprogrammed to increase electrical power or actuation of the trailer brakes responsive to an increase in the number of marks counted. As the coupler counts the marks, i.e. as the tow vehicle brake pedal is continually depressed, the microcontroller sends an increasingly stronger signal to a power transistor 226 and increases the towed vehicle brake application. Correspondingly, as the brake pedal is released, and returns to the original position, the reel or winder will rotate in the opposite direction, and the count of the marks will be decremented. The microcontroller, tracking the current count value, will decrease the application of the towed vehicle brakes proportional to the return movement of the brake pedal. It will be appreciated by those skilled in the art that the braking power applied to the trailer brakes thus is varied in proportion to the brake pedal position of the tow vehicle.

Within the scope of the invention the microcontroller can be programmed with any type of counting/actuation program. The microcontroller could count the marks back to a standard position and remember the count. Then, each successive time the tow vehicle brake pedal is depressed, the microcontroller could count off the same number of marks and apply the towed vehicle brakes. In this manner, the braking of the towed vehicle may be customized. The microcontroller may be further programmed to ignore marks beyond a full "on" position to accommodate for variable such as the loss of brake fluid in the towing vehicle brake system which would allow the brake pedal to be depressed farther than normal.

Additionally, the brake control signal generated by the microcontroller need not be at a 1:1 ratio with the brake pedal position, i.e. ranging from 0% towed vehicle brake application to 100% towed vehicle brake application. A gain control selection unit 228 is mounted in a position accessible by the tow vehicle operator, and preferably includes a push-button means for selecting a desired gain setting. Each gain setting selectable by the operator results in a different proportion of towed vehicle braking relative to the same tow vehicle brake pedal travel distance. The proportional amounts corresponding to each gain setting and the displacement of the tow vehicle brake pedal are preprogrammed into the microcontroller, and accessed dynamically during operation in the form of a table-lookup. For example, as shown in Tables 1–9 below, with an operator selectable gain setting of one, and a mark count of five from maximum pedal displacement, the microcontroller will apply a mere 6% of maximum possible braking force. With a gain setting of five, and the same pedal displacement, the microcontroller will apply 30% of maximum possible braking force.

TABLE 1

| Gain Setting | Mark Count | Braking % |
| --- | --- | --- |
| 1 | 11 | 0 |
| 1 | 10 | 1 |
| 1 | 9 | 2 |
| 1 | 8 | 3 |
| 1 | 7 | 4 |
| 1 | 6 | 5 |
| 1 | 5 | 6 |
| 1 | 4 | 7 |
| 1 | 3 | 8 |
| 1 | 2 | 9 |
| 1 | 1 | 10 |
| 1 | 0 | 11 |

TABLE 2

| Gain Setting | Mark Count | Braking % |
| --- | --- | --- |
| 2 | 11 | 0 |
| 2 | 10 | 2 |
| 2 | 9 | 4 |
| 2 | 8 | 6 |
| 2 | 7 | 8 |
| 2 | 6 | 10 |
| 2 | 5 | 12 |
| 2 | 4 | 14 |
| 2 | 3 | 16 |
| 2 | 2 | 18 |
| 2 | 1 | 20 |
| 2 | 0 | 22 |

TABLE 3

| Gain Setting | Mark Count | Braking % |
| --- | --- | --- |
| 3 | 11 | 0 |
| 3 | 10 | 3 |
| 3 | 9 | 6 |
| 3 | 8 | 9 |
| 3 | 7 | 12 |
| 3 | 6 | 15 |
| 3 | 5 | 18 |
| 3 | 4 | 21 |
| 3 | 3 | 24 |
| 3 | 2 | 27 |
| 3 | 1 | 30 |
| 3 | 0 | 33 |

TABLE 4

| Gain Setting | Mark Count | Braking % |
| --- | --- | --- |
| 4 | 11 | 0 |
| 4 | 10 | 4 |
| 4 | 9 | 8 |
| 4 | 8 | 12 |
| 4 | 7 | 16 |

TABLE 4-continued

| Gain Setting | Mark Count | Braking % |
|---|---|---|
| 4 | 6 | 20 |
| 4 | 5 | 24 |
| 4 | 4 | 28 |
| 4 | 3 | 32 |
| 4 | 2 | 36 |
| 4 | 1 | 40 |
| 4 | 0 | 44 |

TABLE 5

| Gain Setting | Mark Count | Braking % |
|---|---|---|
| 5 | 11 | 0 |
| 5 | 10 | 5 |
| 5 | 9 | 10 |
| 5 | 8 | 15 |
| 5 | 7 | 20 |
| 5 | 6 | 25 |
| 5 | 5 | 30 |
| 5 | 4 | 35 |
| 5 | 3 | 40 |
| 5 | 2 | 45 |
| 5 | 1 | 50 |

TABLE 6

| Gain Setting | Mark Count | Braking % |
|---|---|---|
| 6 | 11 | 0 |
| 6 | 10 | 6 |
| 6 | 9 | 12 |
| 6 | 8 | 18 |
| 6 | 7 | 24 |
| 6 | 6 | 30 |
| 6 | 5 | 36 |
| 6 | 4 | 42 |
| 6 | 3 | 48 |
| 6 | 2 | 54 |
| 6 | 1 | 60 |
| 6 | 0 | 66 |

TABLE 7

| Gain Setting | Mark Count | Braking % |
|---|---|---|
| 7 | 11 | 0 |
| 7 | 10 | 7 |
| 7 | 9 | 14 |
| 7 | 8 | 21 |
| 7 | 7 | 28 |
| 7 | 6 | 35 |
| 7 | 5 | 42 |
| 7 | 4 | 49 |
| 7 | 3 | 56 |
| 7 | 2 | 63 |
| 7 | 1 | 70 |
| 7 | 0 | 77 |

TABLE 8

| Gain Setting | Mark Count | Braking % |
|---|---|---|
| 8 | 11 | 0 |
| 8 | 10 | 8 |
| 8 | 9 | 16 |
| 8 | 8 | 24 |
| 8 | 7 | 32 |
| 8 | 6 | 40 |

TABLE 8-continued

| Gain Setting | Mark Count | Braking % |
|---|---|---|
| 8 | 5 | 48 |
| 8 | 4 | 56 |
| 8 | 3 | 64 |
| 8 | 2 | 72 |
| 8 | 1 | 80 |
| 8 | 0 | 88 |

TABLE 9

| Gain Setting | Mark Count | Braking % |
|---|---|---|
| 9 | 11 | 0 |
| 9 | 10 | 9 |
| 9 | 9 | 18 |
| 9 | 8 | 27 |
| 9 | 7 | 36 |
| 9 | 6 | 45 |
| 9 | 5 | 54 |
| 9 | 4 | 63 |
| 9 | 3 | 72 |
| 9 | 2 | 81 |
| 9 | 1 | 90 |
| 9 | 0 | 99 |

In the preferred operation of this embodiment of the brake controller, there are nine separate linear gain settings, and a tow vehicle brake pedal displacement range of eleven marks. One skilled in the art will recognize that the microcontroller may be preprogrammed with any number of gain settings, both linear and non-linear, and that the range of brake pedal displacement may increased or decreased. Accordingly, variations in the number and type of gain settings, and the brake pedal displacement range are considered within the scope of this invention.

After installation of the microcontroller embodiment of the present invention in a tow vehicle, the brake controller must be initialized to the maximum displacement of the tow vehicle brake pedal. Initialization is performed by the operator fully depressing the tow vehicle brake pedal to the maximum braking position, and then pressing a "Set Brake" switch 230 located either on the controller housing or on the gain control selection unit. The microcontroller receives a signal from the switch, and enters an initialization mode. As the operator releases the brake pedal, and the reel or winder rotates within the housing, the microcontroller counts from zero the number of marks which pass the optical coupler. In the preferred embodiment, the eleventh mark is considered to be the appropriate brake initiation point, i.e. the displacement position of the tow vehicle brake pedal from maximum braking at which the microcontroller will actuate the towed vehicle brakes. The power delivered to the towed vehicle brakes at the eleventh mark is proportional to the gain setting selected as described above. Once the brake pedal returns to the rest position, the microcontroller records the total number of marks corresponding to the pedal displacement, and signals that the initilization procedure has been completed and the system is ready for normal operation. It will be noted by one skilled in the art that the operator need not fully depress the tow vehicle brake pedal before initializing the system. If the system is initialized to a less-than maximum brake pedal depression, the responsiveness of the towed vehicle brakes to the brake pedal position of the two vehicle will be greatly increased.

Figure 4:
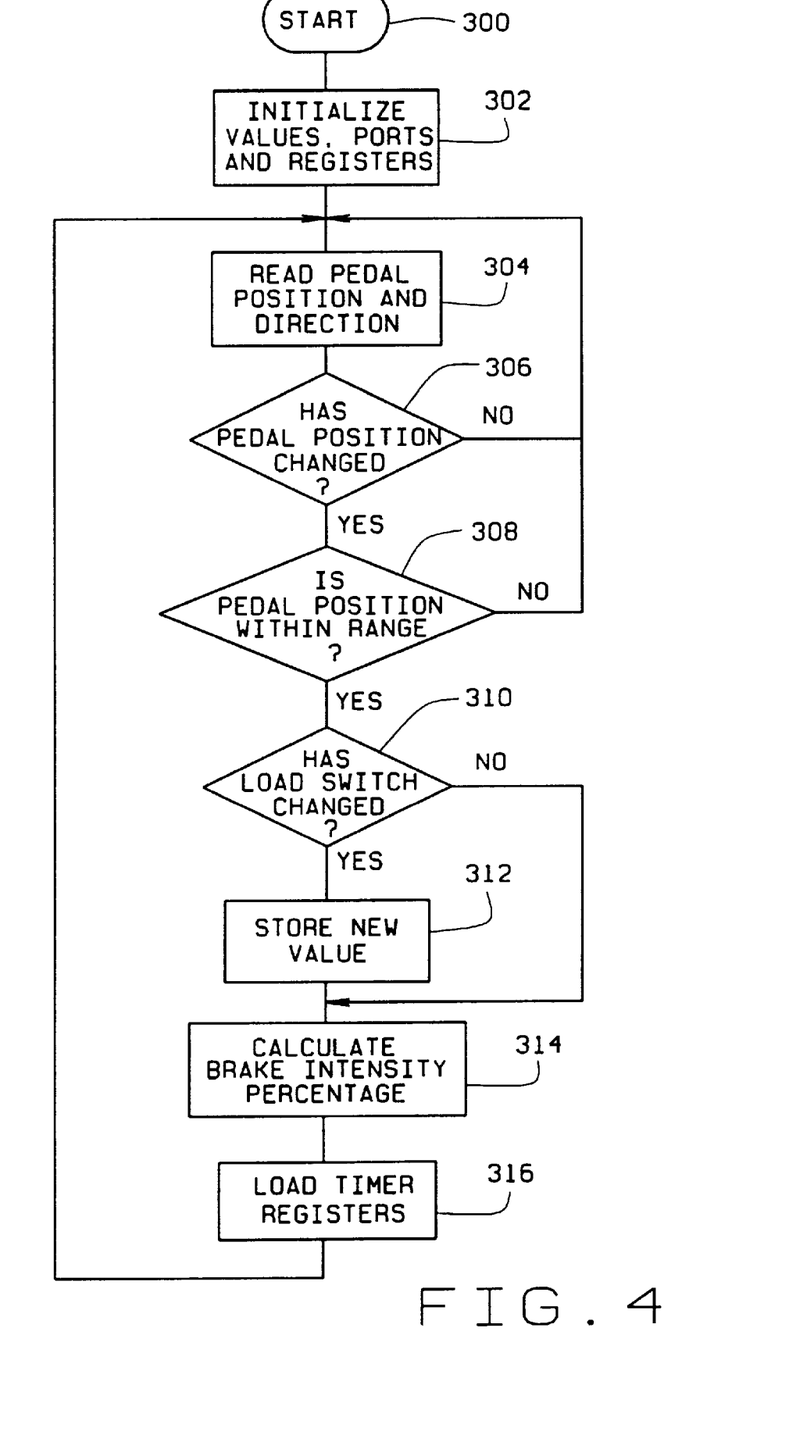
FIG. 4 is a flow chart illustrating the steps in the operation of the brake controller of the present invention.

Operation of the microcontroller embodiment of the present invention is described below in reference to the flow chart of FIG. 4. Upon activation (Block 300), the brake controller loads either the default values into the ports and registers of the microcontroller, or the stored settings resulting from a completed initialization procedure as described above (Block 302). Upon completion of the load step, the brake controller beings the normal operation cycle. The microcontroller continually checks the count of the marks detected by the optical coupler, and the direction of any pedal travel (Block 304). An increment in the mark count corresponds to a release of the pedal, and a decrement corresponds to a depression of the brake pedal during braking. If there is no change in the brake pedal position (Block 306), the microcontroller repeats the check procedure. If a change in the brake pedal position is detected, the microcontroller compares the current count of the marks with the predetermined brake initiation range (Block 308). In the preferred embodiment described above, the brake initiation range is between counts zero and eleven. If the current count of marks is outside of the brake initiation range, no towed vehicle braking is indicated, and the check procedure cycle repeats.

If the current count of marks is within the brake initiation range, the microcontroller must determine the appropriate level of towed vehicle braking to apply. First, the current gain setting is checked to determine if there has been a change (Block 310). If there is a change, the new value is stored (Block 312). If there has been no change since the previous cycle, or if a new value has been detected and stored, the microcontroller utilizes the current count of marks and the gain setting to determine the appropriate towed vehicle braking percentage from the stored look-up tables (Block 314). Based on the determined towed vehicle braking percentage, the final step in the cycle is for the microcontroller to load the appropriate setting into the timer registers which produce signal controlling the towed vehicle brakes. (Block 316). Upon completion of the register load step, the microcontroller starts the entire cycle over by again reading the tow vehicle brake pedal position and direction. (Block 304).

Figure 5:
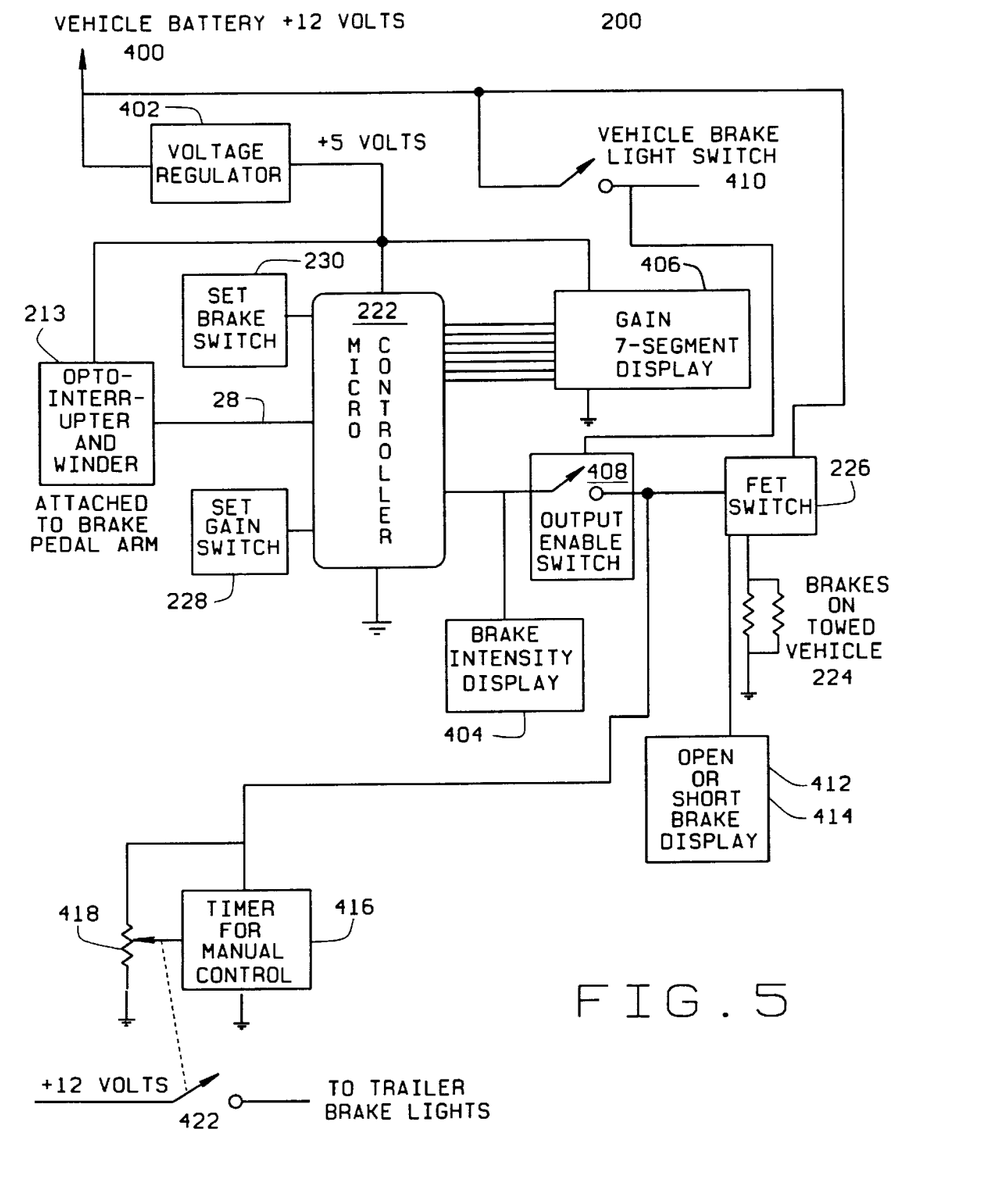
FIG. 5 is a block diagram of the electronic brake controller of the present invention.
Figure 6:
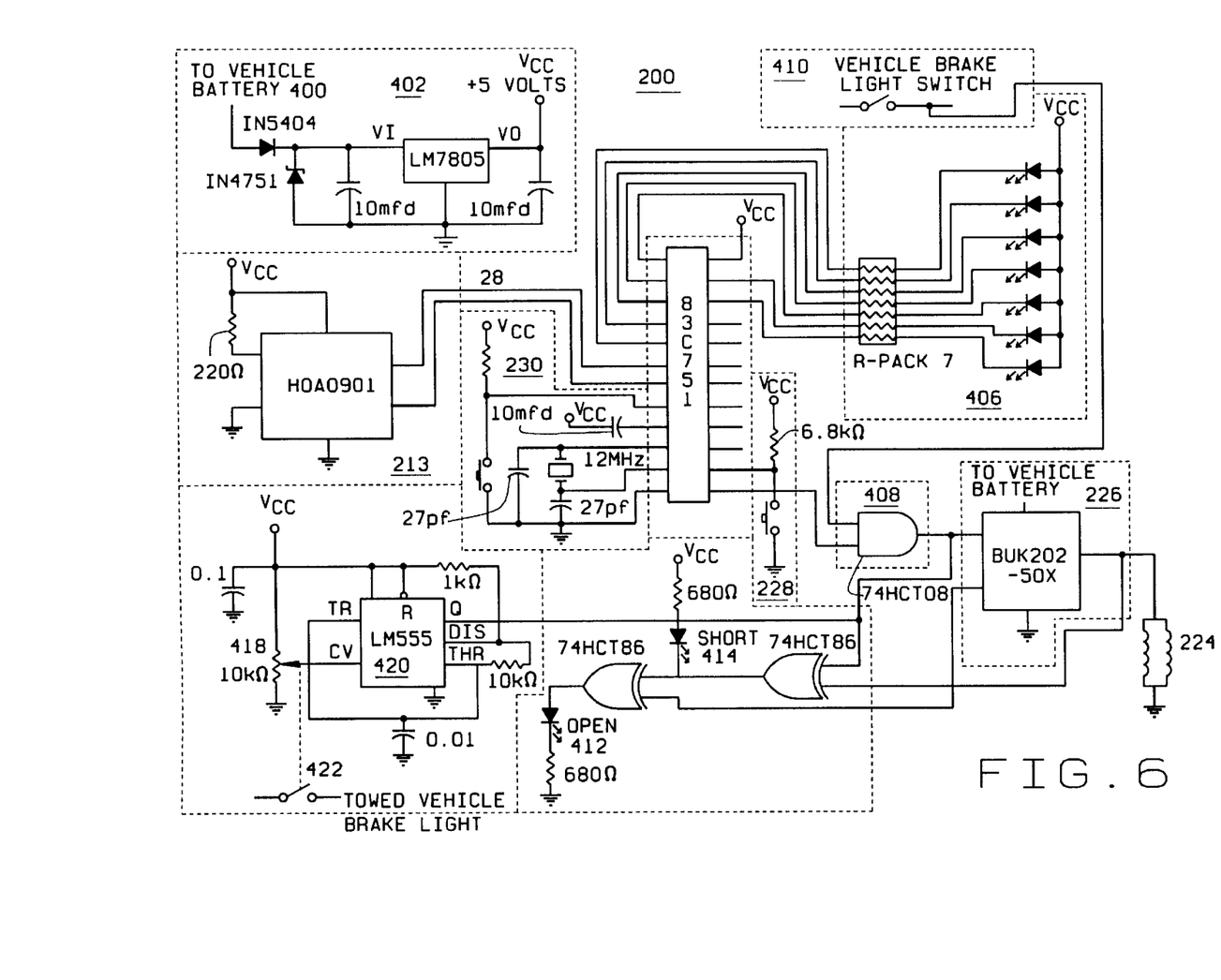
FIG. 6 is a schematic circuit diagram illustrating a preferred embodiment of the electronic brake controller shown in FIG. 5.

Turning to FIGS. 5 and 6, the various system components comprising the brake controller 200 of the third preferred embodiment are shown. Electrical power is supplied to both the brake controller 200 and to the towed vehicle brake system 224 by the tow vehicle battery 400, typically rated at +12 volts. The voltage supplied to the brake control system from the vehicle battery is regulated to +5 volts by a voltage regulator 402.

The microcontroller 222, preferably a model 83C751 manufactured by Phillips Semiconductor of Sunnyvale, Calif., receives power from the voltage regulator 402 and input signals from the Set Brake switch 230, the Set Gain switch 228, and the optical coupler 213. The microcontroller includes in internal timer which can be programmed to run for a length of time determined by a value loaded into one or more internal timing registers. The values stored in the timing registers correspond to the particular combination of tow vehicle brake pedal position and gain setting as described above.

The optical coupler is preferably a model HOA0901 manufactured by Honeywell, and is configured to provide an input signal to the microcontroller responsive to the displacement of the tow vehicle brake pedal as described above. The operations of the Set Brake and Set Gain switches are similarly described above in conjunction with the initialization of the brake controller and with the selection of the desired towed vehicle braking force.

Output from the microcontroller is directed towards control of the Brake Intensity display 404 and the Gain display 406. The Brake Intensity display 404 provides the operator with a visual indication of the towed vehicle braking percentage being applied by the brake controller 200 at any given moment. Similarly, the Gain display 406 provides a continuous visual indication of the currently selected gain setting.

Additionally output from the microcontroller 222 is directed towards control of the output device 226, a TOPFET high side switch, preferably a model BUK202-50X manufactured by Phillips Semiconductor of Sunnyvale, Calif. An output enable switch 408 interrupts the connection between the microcontroller and the output device 226 whenever the tow vehicle brake light switch 410 is not enabled. The connection to the brake light switch 410 is important to prevent the unlikely event that the set brake switch 230 is pushed with the brake pedal just slightly depressed to a point with fewer than eleven chain counts to pedal-rest-position, resulting in the towed vehicle brakes being activated with the tow vehicle brake pedal in the "rest" position. Accordingly, the brake light switch 410 acts to eliminate activation of the towed vehicle brakes absent sufficient movement of the tow vehicle brake pedal from a rest position. Assuming the output enable switch 408 is closed, as during normal tow vehicle braking, the microcontroller 222 sends a cyclic output signal of +5 volts to the output device 226 at a rate dependent upon the value stored in the internal timing registers of the microcontroller. When the output signal from the microcontroller drives the input of the output device high (+5 volts), the output device activates, and allows current at +12 volts to flow through the towed vehicle brakes 224. When the microcontroller output signal drops to +0 volts, the output device switches off, preventing current flow through the brakes. By controlling on-off ratio of the output signal, and correspondingly the current flow to the towed vehicle brakes, the microcontroller 222 can control the towed vehicle brake application.

In addition to controlling the flow of current to the towed vehicle braking system, the output device 226 further includes components configured to detect and indicate to the operator open circuit and short circuit conditions. An open circuit indicator 412 and a short circuit indicator 414 continually check the integrity of the towed vehicle brake circuits.

A manual control circuit 416, consisting of a variable resistor 418 and a timer 420 is additionally connected to the input of the output device 226. When the operator actuates the manual control circuit 416, the timer 420 triggers the illumination of the towed vehicle brake lights by closing a switch 422 and sends a +5 volt cyclic signal to the output device 226. The on-off ratio of the cyclic signal is proportional to the level of braking manually selected by the operator.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

I claim:

1. An electronic brake controller for actuating electric wheel brakes of a towed vehicle, the towed vehicle being associated with a tow vehicle having an arm-mounted brake pedal, the electronic brake controller comprising:

a sensor including an index element operatively associated with the brake pedal and an optical coupler responsive to a displacement of the index element for producing a brake control signal which is representative of the desired braking of the towed vehicle; and a microcontroller responsive to said brake control signal for generating an output signal for actuating the towed vehicle electric wheel brakes.

2. The electronic brake controller of claim 1 wherein said control means is a microcontroller.

3. The electronic brake controller of claim 1 further including:

a means for selecting a braking gain setting, said braking gain setting representative of a desired proportionality between tow vehicle brake pedal displacement and towed vehicle braking percentage;

said control means further responsive to said selected gain setting for generating said output signal for actuating said towed vehicle electric wheel brakes.

4. The electronic brake controller of claim 1 further including a second control means responsive to operator input for generating an output signal for actuating the towed vehicle electric wheel brakes.

5. The electronic brake controller of claim 1 wherein:

said sensor further includes a housing operatively connected to one of said brake pedal arm or a stationary fixture in the tow vehicle, said housing including a vertically elongated opening on a forward peripheral edge;

said index element comprises a spring-loaded winder contained within said housing, said index element including a tension element secured at a first end to said reel and secured at a second end to the other of said brake pedal arm or said stationary fixture in said tow vehicle, said tension element tensioned by said spring-loaded winder to maintain a constant tension responsive to displacement of said brake pedal arm;

said optical coupler is disposed within said housing, adjacent said vertically elongated opening, an optical detector of said optical coupler variably exposed to light emitted by an emitter of said optical coupler proportional to alterations in geometry between said tension element and said housing arising from displacement of said brake pedal arm, said optical coupler generating a brake control signal responsive to said proportional light exposure.

6. The electronic brake controller of claim 1 wherein:

said sensor further includes a housing operatively connected to one of said brake pedal arm or a stationary fixture in said tow vehicle;

said index element comprises a spring-loaded winder contained within said housing, said index element including a chain comprising a plurality of links, said chain secured at a first end to said reel, and secured at a second end to the other of said brake pedal arm or said stationary fixture in said tow vehicle, said chain extending and retracting proportional to displacement of said brake pedal arm;

said optical coupler disposed within said housing and adjacent said chain, said optical coupler configured to count links of said chain passing said optical coupler during displacement of said brake pedal arm, said optical coupler further configured to generate a brake control signal corresponding to said count.

7. The electronic brake controller of claim 6 wherein said sensor further comprises a means configured for determining the direction of travel of said chain links.

8. An electronic brake controller for actuating electric wheel brakes of a towed vehicle, the towed vehicle being associated with a tow vehicle having an arm-mounted brake pedal, the electronic brake controller comprising:

a sensor responsive to a displacement of the tow vehicle brake pedal arm for producing a brake control signal which is representative of the desired braking of the towed vehicle; said sensor having (a) a housing operatively connected to said brake pedal arm;

(b) a spring-loaded reel contained within said housing, said reel including a tapered peripheral edge;

(c) an optical coupler disposed within said housing, adjacent said reel, such that rotation of said tapered peripheral edge gradually exposes an optical receiver of said optical coupler to light emitted by a light emitter of said optical coupler, said optical coupler configured to generate a brake control signal corresponding to said gradual exposure;

(d) a tension element secured at a first end to said reel, and secured at a second end to a point in said tow vehicle, said tension element causing rotation of said reel proportional to displacement of said brake pedal arm; and a microcontroller responsive to said brake control signal for generating an output signal for actuating the towed vehicle electric wheel brakes.

9. An electronic brake controller for actuating electric wheel brakes of a towed vehicle, the towed vehicle being associated with a tow vehicle having an arm-mounted brake pedal, the electronic brake controller comprising:

a sensor responsive to a displacement of the tow vehicle brake pedal arm for producing a brake control signal which is representative of the desired braking of the towed vehicle; said sensor having (a) a housing operatively connected to said brake pedal arm, said housing including a vertically elongated opening on a forward peripheral edge, (b) a spring-loaded winder contained within said housing, (c) a tension element secured at a first end to said reel and secured at a second end to a point in said tow vehicle, said tension element tensioned by said spring-loaded winder to maintain a constant tension responsive to displacement of said brake pedal arm, (d) an optical coupler disposed within said housing, adjacent said vertically elongated opening, an optical detector of said optical coupler variably exposed to light emitted by an emitter of said optical coupler proportional to alterations in geometry between said tension element and said housing arising from displacement of said brake pedal arm, said optical coupler generating a brake control signal responsive to said proportional light exposure, and a microcontroller responsive to said brake control signal for generating an output signal for actuating the towed vehicle electric wheel brakes.

10. An electronic brake controller for actuating electric wheel brakes of a towed vehicle, the towed vehicle being associated with a tow vehicle having an arm-mounted brake pedal, the electronic brake controller comprising:

a sensor responsive to a displacement of the tow vehicle brake pedal arm for producing a brake control signal which is representative of the desired braking of the towed vehicle; said sensor having (a) a housing operatively connected to said brake pedal arm, (b) a spring-loaded winder contained within said housing, (c) a chain comprising a plurality of links, said chain secured at a first end to said reel, and secured at a second end to a point in said tow vehicle, said chain extending and retracting proportional to displacement of said brake pedal arm, (d) an optical coupler disposed within said housing and adjacent said chain, said optical coupler configured to count links of said chain passing said optical coupler during displacement of said brake pedal arm, said optical coupler further configured to generate a brake control signal corresponding to said count; and a microcontroller responsive to said brake control signal for generating an output signal for actuating the towed vehicle electric wheel brakes.

11. The electronic brake controller of claim 10 wherein said sensor further comprises a means configured for determining the direction of travel of said chain links.

12. A brake controller comprising:

a spring loaded rotating reel disposed to rotate a predetermined distance in response to displacement of a tow vehicle brake pedal armature, said reel having a plurality of index means thereon;

an optical device for counting said index means as said reel rotates;

a microcontroller electronically connected to said optical device, said microcontroller being electronically connected to a braking system of a towed vehicle and preprogrammed to convert input data from said optical device into actuation of said towed vehicle braking system, said actuation proportional to the movement of said tow vehicle brake pedal armature.

13. A method for actuating electric wheel brakes of a towed vehicle, the towed vehicle being associated with a tow vehicle having an arm-mounted brake pedal, the method including:

establishing the operating parameters for the tow vehicle brakes;

detecting optically changes in the tow vehicle brake pedal position;

determining a towed vehicle brake actuation percentage proportional to the detected change in said tow vehicle brake pedal position;

controlling said electric wheel brakes of said towed vehicle to achieve said determined brake actuation; and repeating the steps of detecting, determining, and controlling at least once.

14. The method for actuating electric wheel brakes of a towed vehicle as set forth in claim 13 where establishing the operating parameters for the tow vehicle brakes includes determining the maximum displacement of said tow vehicle arm-mounted brake pedal.

15. The method for actuating electric wheel brakes of a towed vehicle as set forth in claim 13 where detecting optically changes in the tow vehicle brake pedal position includes detecting angular displacement in said brake pedal arm.

16. The method for actuating electric wheel brakes of a towed vehicle as set forth in claim 13 where detecting optically changes in the tow vehicle brake pedal position includes detecting horizontal displacement in said brake pedal arm.

17. The method for actuating electric wheel brakes of a towed vehicle as set forth in claim 13 where determining a towed vehicle brake actuation percentage includes:

receiving a desired brake actuation gain setting;

determining an brake actuation percentage responsive to said actuation gain setting and to said detected change in said tow vehicle brake pedal position.

18. The method for actuating electric wheel brakes of a towed vehicle as set forth in claim 13 where controlling said electric wheel brakes of said towed vehicle to achieve said determined brake actuation includes alternately energizing and de-energizing said electric wheel brakes.

19. The electronic brake controller of claim 1 wherein:

said sensor further includes a housing operatively connected to one of said brake pedal arm or a stationary fixture in the tow vehicle;

said index element comprises a spring-loaded reel contained within said housing, said reel including a tapered peripheral edge, said index element including tension element secured at a first end to said reel, and secured at a second end to the other of said brake pedal arm or said stationary fixture in said tow vehicle, said tension element causing rotation of said reel proportional to displacement of said brake pedal arm; and wherein said optical coupler is disposed within said housing, adjacent said reel, such that rotation of said tapered peripheral edge gradually exposes an optical receiver of said optical coupler to light emitted by a light emitter of said optical coupler, said optical coupler configured to generate a brake control signal corresponding to said gradual exposure.

* * * * *

UNITED STATES PATENT AND TRADEMARK OFFICE
CERTIFICATE OF CORRECTION

PATENT NO. : 6,050,649
DATED : April 18, 2000
INVENTOR(S) : James C. Hensley

It is certified that error appears in the above-identified patent and that said Letters Patent is hereby corrected as shown below:

Assignee should read:

-- James C. Hensley Revocable Trust --

Signed and Sealed this

Sixteenth Day of October, 2001

Attest:

*Nicholas P. Godici*

NICHOLAS P. GODICI
*Attesting Officer*    *Acting Director of the United States Patent and Trademark Office*